Feb. 23, 1971 H. E. BRADLEY 3,564,945
DRILL

Filed Oct. 2, 1968 2 Sheets-Sheet 1

Inventor
Harry Edwin Bradley
BY Watson, Cole, Grindle & Watson
Attorneys

Feb. 23, 1971 H. E. BRADLEY 3,564,945
DRILL
Filed Oct. 2, 1968 2 Sheets-Sheet 2
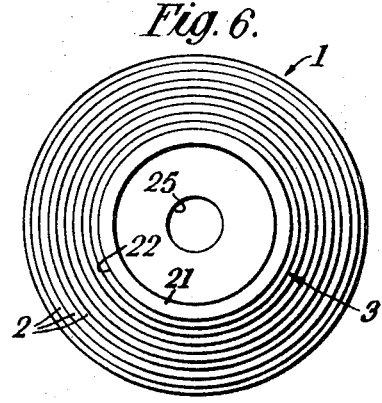
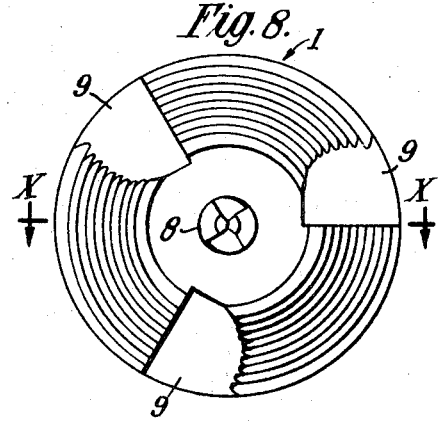
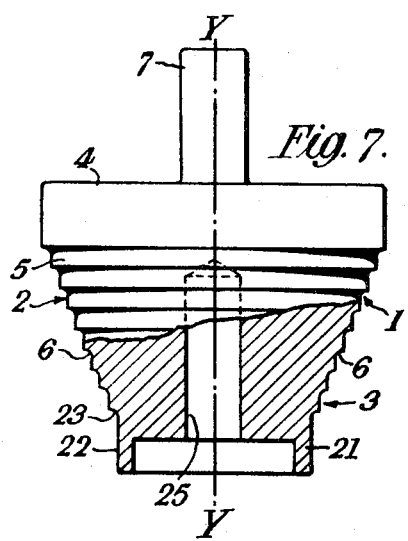
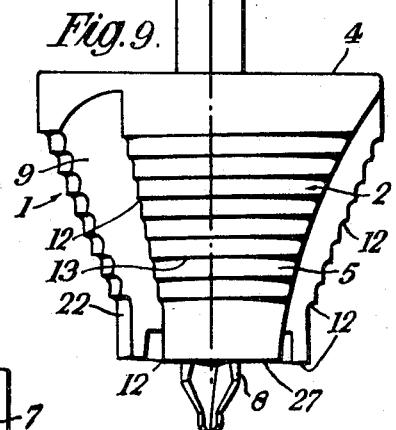
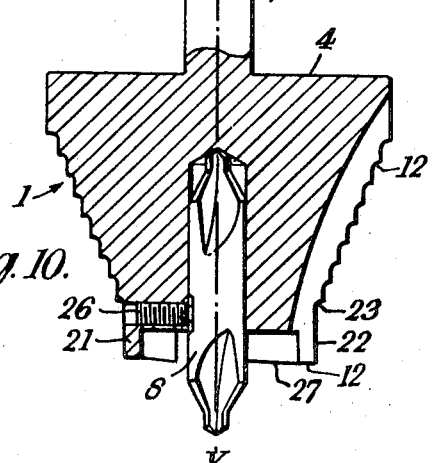

United States Patent Office 3,564,945
Patented Feb. 23, 1971

3,564,945
DRILL
Harry Edwin Bradley, Tooting, London, England, assignor to Barworth Flockton Limited, Ecclesfield, near Sheffield, Yorkshire, England, a British company
Filed Oct. 2, 1968, Ser. No. 764,431
Claims priority, application Great Britain, Oct. 10, 1967, 46,235/67, 46,236/67
Int. Cl. B23b 51/08
U.S. Cl. 77—65                                    7 Claims

ABSTRACT OF THE DISCLOSURE

A unitary cutting drill designed for cutting a plurality of different sized holes comprising a frusto-conical bit having its inclined surface formed of a series of steps which progressively increase in diameter from the small diameter end to the base thereof. The inclined surface is relieved of material to form a cutting edge for each step of the series.

---

Figure 1:
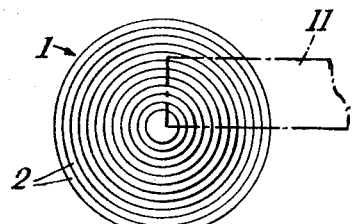

This invention relates to an improved drill for cutting into or through metal or other materials such as synthetic resins.

According to the present invention a drill for rotation about an axis comprises a substantially frusto-conical member having a small-diameter end, a base end and an inclined periphery extending between said ends, a series of steps formed in the inclined periphery of said member and progressively increasing in diameter from said small-diameter end to said base end, each such step having a wall which is parallel with said axis and which merges into a radiused part directly joining said wall to the corresponding parallel walls of the immediately adjacent step, said inclined periphery of said member being relieved of material to provide a cutting edge at said radiused part for each step of the series, and each of said steps being backed off in the direction of said base end to provide clearance behind the respective associated cutting edge upon rotation of the drill.

To facilitate lining up the drill in operation, said member preferably carries at its small-diameter end a pilot extension drill which is coaxial with the axis of rotation of said member. In one embodiment of the present invention, the pilot extension drill may advantageously be made removable from the frusto-conical member. One end of the pilot extension drill in this same embodiment may be housed within a bore in said member while the other end thereof projects coaxially from said small-diameter end; in this case each end of the pilot extension drill may be formed with at least one cutting edge so that the extension drill may be reversed when worn.

Each of the steps in the series is preferably provided with an uneven plural number of cutting edges (say three or five, for example) equi-angularly spaced about the axis of rotation of said member; this provision of an uneven number of cutting edges has the advantage that it reduces chatter in operation of the drill. The increase in step diameter may be—but is not necessarily—uniform from step to step, considered from the small-diameter end of said member to the base end thereof.

In one embodiment of the invention an arcuate skirt may depend from said small-diameter end and may have a wall parallel with the axis of rotation of said member, said wall preferably being directly joined by a radiused or chamfered part to the parallel wall of the step at said small-diameter end and being relieved of material to provide at least one cutting edge for the skirt. In practice the skirt, like the aforesaid steps, is preferably provided with an uneven plural number of cutting edges equi-angularly spaced about the axis of rotation of said member.

Means for fitting said base to a chuck or mandrel may comprise a central recess for receiving the end of a solid mandrel. Alternatively and preferably, however, the frusto-conical member may be provided with a shank projecting coaxially from said base end for fitting to a chuck or hollow mandrel.

Figure 3:
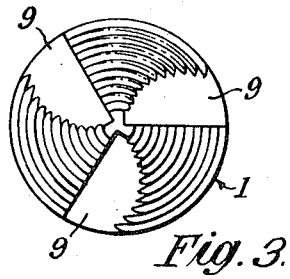
Figure 2:
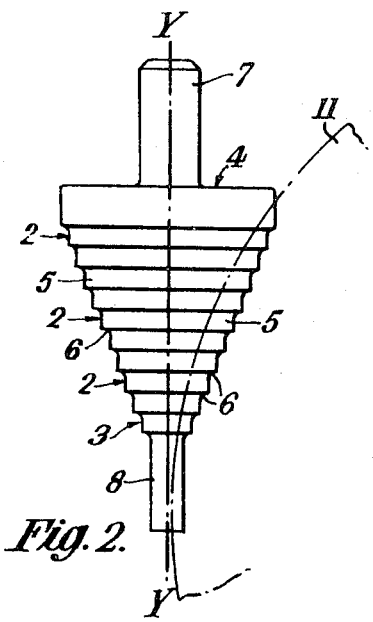
Figure 4:
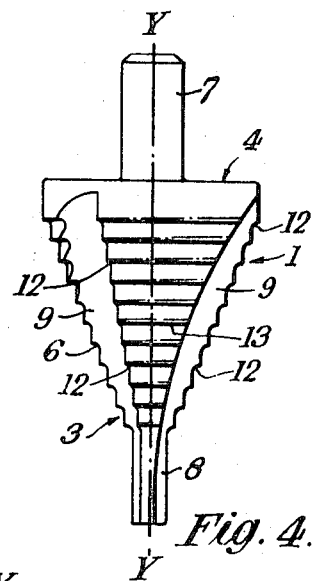
Figure 5:
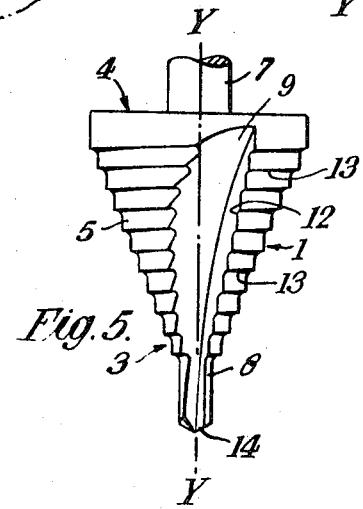

Drills representing two embodiments of the present invention, and a method of producing them, will now be described in greater detail and by way of example with reference to the accompanying drawings in which:

FIG. 1 is an end elevation of the frusto-conical member of the first embodiment from the small-diameter end thereof and prior to the provision of cutting edges therein, FIG. 2 is a side elevation of the frusto-conical member of FIG. 1, FIG. 3 is an end elevational view generally corresponding to FIG. 1 but showing the frusto-conical member after the provision of cutting edges, FIG. 4 is a side elevation of the frusto-conical member shown in FIG. 3, FIG. 5 is a side elevational view of the drill of the first embodiment in its finished form, FIG. 6 is an end elevation of the frusto-conical member of the second embodiment from the small-diameter end thereof and prior to the provision of cutting edges therein, FIG. 7 is a side elevation, partly in section, of the frusto-conical member of FIG. 6, FIGS. 8 and 9 are respectively an end elevation and a side elevation of the drill of the second embodiment in its finished form, and FIG. 10 is a cross-section through the finished drill of the second embodiment taken on the line X—X of FIG. 8.

With regard to the first embodiment, and with specific reference first to FIGS. 1 and 2, the drill comprises a substantially frusto-conical member 1 the inclined side of which is formed, by a turning operation, with a series of ten steps 2. From the small-diameter end 3 to the base end 4 of the member 1, the steps 2 progressively and uniformly increase in diameter—each step (except for the lowermost in the series; that is, the step at the small-diameter end 3) being one-eighth of an inch greater in diameter than the step below it.

Each of the steps 2 presents an initially cylindrical wall 5 parallel with the axis of generation Y—Y of the member 1, that axis also being the axis of rotation of the finished drill, and each wall 5 is directly joined by a radiused part 6 (having a radius of one-sixteenth of an inch) to the wall 5 of the immediately adjacent step. The member 1 is provided with a shank 7 which projects coaxially from the base 4 for fitting into a chuck or hollow mandrel; and is also provided with a pilot extension 8 which projects coaxially from the end 3 of the member 1. The pilot extension has a diameter one-eighth of an inch smaller than the lowermost one of the steps 2.

Starting from the condition shown in FIGS. 1 and 2, the frusto-conical member 1 and the pilot extension 8 are relieved of material in three separate and equi-angularly spaced zones 9; this relieving operation is effected by a revolving milling cutter indicated schematically at 11 in FIGS. 1 and 2, and results (as shown particularly in FIGS. 4 and 5) in the provision of three radiused cutting edges 12 for each step 2. Thus the milling operation, in effect, divides each step 2 and the pilot extension 8 into three arcuate sections, each of the step sections having its own cutting edge 12 and each of the pilot extension sections being later formed with a cutting edge as described hereinafter.

When the cutting edges 12 have been formed, and the tool hardened and tempered, the member 1 is further relieved of material in two separate grinding operations whereby the steps 2 are backed off both radially of the member 1 and axially thereof. The extent of the radial backing off is indicated in FIG. 3, where the chain-dotted lines show the required circumferential profile of one arcuate section of steps after radial grinding away of the member 1. It will be appreciated that each such arcuate section of steps is ground similarly so that, when the radial backing off operation is completed, each arcuate section of each step has its radially greatest dimension adjacent the associated cutting edge 12 and its radially smallest dimension at its rearward edge; that is, the edge adjacent the following relief zone 9 considered in the direction of rotation of the drill in operation.

The extent of axial backing off is indicated in FIG. 4, where the chain-dotted lines show the required slight upward inclination to be given to the lower edge 13 of each step section by grinding away each step section axially of, and towards the base 4 of, the member 1.

After these radial and axial backing off operations, the pilot extension 8 is ground at its tip to provide three cutting edges 14, each adjacent a different one of the three relief zones 9, and the finished drill assumes the appearance shown in FIG. 5.

It will be appreciated that although the drill has been described above, and is shown in the accompanying drawings, as having ten steps, in fact it may have any other practicable number of steps. Moreover the difference in diameter, from step to step, may naturally be other than one-eighth of an inch. However taking as an example the drill specifically described above, it will be seen that it may be used to drill any one of eleven different diameter holes, the drilling range ascending in intervals of one-eighth of an inch and having its top and bottom limits set, respectively, by the cutting diameter of the uppermost step 2 and the cutting diameter of the pilot extension 8.

In practice it is envisaged that a set of, say, eight differently sized drills will be made available, each for example having ten steps such as 2 and a pilot extension such as 8 and each presenting eleven cutting diameters which increase by intervals of one-eighth of an inch from bottom to top. It is proposed to make the cutting diameters of the eight pilot extensions increase, from drill to drill, by intervals of, say, one sixty-fourth of an inch from a minimum of seven thirty-seconds of an inch. With such a set of drills the user will have a cutting head available for every interval of one sixty-fourth of an inch within the drilling range of the set, the upper and lower limits of which range are one inch and thirty-seven sixty-fourths, and seven thirty-seconds of an inch, respectively.

Similarly it is proposed to provide a set of drills which are dimensioned in the metric system, the pilot extensions increasing from drill to drill by intervals of, say, 0.5 mm. from a minimum of 5.5. mm. and the step diameter increasing by intervals of 3 mm. With six such drills in the set, and each drill presenting eleven cutting diameters as in the embodiment specifically described above, the user will have a cutting head available for every interval of 0.5 mm. within the drilling range of the set, that is, from 5.5 mm. to 38 mm.

In the second embodiment of the invention, which will now be described with reference to FIGS. 6 to 10, parts which are the same as or similar to those in the first embodiment are designated by the same reference numerals.

It will be seen that the drill of the second embodiment again comprises a substantially frusto-conical member 1 the inclined side of which is formed with a series of steps 2 (in this embodiment, eight in number) which again progressively and uniformly increase in diameter from the end 3 to the end 4 by intervals of one-eighth of an inch. Again the steps 2 are interconnected by radiused parts 6 and, as in the first embodiment, the member 1 is provided with a shank 7 which projects coaxially from the base end 4 for fitting into a chuck or hollow mandrel.

The second embodiment differs from the first in that it is formed integrally with an initially annular skirt 21 which depends from the small-diameter end 3 of the member 1 and which, in this exemplary embodiment, has an outside diameter one-eighth of an inch less than the lowermost step 2. An initially cylindrical wall 22 of the skirt 21 (which, like the walls 5 of the steps 2, is parallel with the axis of rotation Y—Y) is directly joined by a radiused part 23 to the wall 5 of the lowermost step 2.

The member 1 is formed with a coaxial blind bore 25, which opens into the small-diameter end 3 and which in the finished drill serves to house one end of a double-ended pilot extension drill 8 of the combination countersink and centre drill type, the other end of the pilot extension 8 projecting from the drill below the lower edge of the skirt 21 and the pilot extension being removably held in place by a grub-screw 26 inserted from one side of the member 1. For certain uses of the drilling tool, to which reference is made hereinafter, the combination countersink and centre drill pilot extension may be replaced by a single-ended stub twist drill.

By a revolving milling cutter, as in the first embodiment, the member 1 and the integral skirt 21 are relieved of material in three separate and equi-angularly spaced zones 2 to result in the provision of three cutting edges 12 for each step 2 and for the skirt 21, the milling operation effectively dividing each step and the skirt into three arcuate sections each with its own cutting edge 12.

When the cutting edges 12 have been formed, the steps 2 and the skirt 21 are backed off both radially of the member 1 and axially thereof in two separate grinding operations similar to those described above with respect to the first embodiment. The extent of radial backing off is apparent from FIG. 8 where it will be seen that each arcuate section of the wall 22 and of each of the walls 5 is gradually and increasingly ground away from the cutting edge side of the associated relief zone 9 to the rearward edge of the section; and the extent of axial backing off is apparent from FIG. 9, where it will be seen that the lower edge 13 of each arcuate step section, and the lower edge 27 of the skirt 21, is ground away towards the base end 4 so that these lower edges are given a slight upward inclination away from their respective cutting edges 12.

To complete the drill, the pilot extension 8 is inserted in the bore 25 and is removably held therein by the grub-screw 26, as described above. Each end of the pilot extension 8 (at least in the illustrated embodiment) is provided with a plurality of cutting edges and a drilling point, so that when one end of the pilot extension shows signs of wear the pilot extension may be reversed in its housing and the other end used for drilling.

As in the first embodiment, the drill of the second embodiment may have any practicable number of steps and the step-to-step diameter increase may naturally be other than one-eighth of an inch. However taking as an example the specifically described second embodiment of the invention, it will be seen that it may be used to drill any one of nine different diameter holes, the drilling range ascending in intervals of one-eighth of an inch. Assuming the absence of the pilot extension drill 8, which in this second embodiment is primarily provided only for the purpose of lining up the drill, the cutting diameter of the skirt 21 represents the smallest bore that can be cut by the drill, while the largest bore is represented by the cutting diameter at the uppermost step 2.

In practice, as with the first embodiment, it is intended to provide a set of, say, eight differently sized drills, with the cutting diameters of the various skirts 21 increasing by, say, one sixty-fourth of an inch from drill to drill from a minimum of one inch and fifteen thirty-seconds for example. With such a set the user will have a cutting edge available for every interval of one sixty-fourth of an inch within the range of the set, that range being determined at one extreme by the cutting diameter of the smallest skirt (one inch and fifteen thirty-seconds) and at the other extreme by the cutting diameter of the uppermost step 2 in the largest drill of the set (two inches and thirty-seven sixty-fourths).Thus the drilling range of the set of drills in accordance with the second embodiment of the invention, complements the range of the set according to the first embodiment, the two sets between them providing a cutting edge for every interval of one sixty-fourth of an inch from seven thirty-seconds of an inch to two inches and thirty-seven sixty-fourths.

As with the first embodiment, it is proposed to provide a set of drills as shown in FIGS. 6 to 10 dimensioned in the metric system, the skirts increasing from drill to drill by intervals of, say, 0.5 mm. from a minimum of 35.5 mm. and the step diameter increasing by intervals of 3 mm. With six such drills in the set and each drill presenting nine cutting diameters, as in the embodiment shown in FIGS. 6 to 10, the user will have a cutting head available for every interval of 0.5 mm. within the drilling range of the set, that is from 35.5 mm. to 62 mm.

In both embodiments the drill of the present invention is primarily intended for drilling sheets of material having a thickness of not more than the depth of each step 2 but thicker material can be drilled by reversing the material under the drill after the required step or skirt has completed a cutting operation, and drilling the material from the other side. When the second embodiment is in use and such reversed drilling is envisaged, it is preferred to use the above-mentioned single-ended stub twist drill, instead of the illustrated combination countersink and centre drill, as the pilot extension 8.

In both embodiments the drill has the advantage that at the completion of a drilling operation, that is when the step or skirt whose radiused cutting edge is performing the cutting action has penetrated to its full depth in the material being drilled, the radiused cutting edge 6, or 23 as the case may be, removes any burr from the upper edge of the hole which has been cut. Thus the drill serves not only to cut holes but also as a deburring tool.

Although in both embodiments described above the step-to-step diameter increase and the depth of the steps remain constant from the small-diameter end to the base end of the member 1 it will be appreciated that this need not be so. In fact the step diameter increase and the depth of the steps may be varied to suit the intended use of any particular drill.

What I claim as my invention and desire to secure by Letters Patent is:

1. A drill for rotation about an axis, comprising a substantially frusto-conical member having a small-diameter end, a base end and an inclined periphery extending between said ends, a series of steps formed in the inclined periphery of said member and progressively increasing in diameter from said small-diameter end to said base end, each such step having a wall which is parallel with said axis and which merges into a radiused part directly joining said wall to the corresponding parallel wall of the immediately adjacent step, said inclined periphery of said member being relieved of material to provide a cutting edge at said radiused part for each step of the series, and each of said steps being backed off in the direction of said base end to provide clearance behind the respective associated cutting edge upon rotation of the drill.

2. A drill according to claim 1, wherein said member carries at its small-diameter end a pilot extension drill which is coaxial with said axis.

3. A drill according to claim 1, wherein said steps are each provided with an uneven plural number of cutting edges equi-angularly spaced about said axis.

4. A drill according to claim 1, wherein the increase in step diameter is uniform from step to step, considered from the small-diameter end of said member to the base end thereof.

5. A drill for rotation about an axis, comprising a substantially frusto-conical member having a small-diameter end, a base end and an inclined periphery extending between said ends, a series of steps formed in the inclined periphery and progressively increasing in diameter from said small-diameter end to said base end, and an arcuate skirt at said small-diameter end, said skirt and each of said steps having a wall which is parallel with said axis and which merges into a radiused part directly joining said wall to the corresponding parallel wall of the immediately adjacent step, said skirt and said inclined periphery of said member being relieved of material to provide a cutting edge for said skirt and for each step of said series, and said skirt and each of said steps being backed off in the direction of said base end to provide clearance behind the respective associated cutting edge upon rotation of the drill.

6. A drill according to claim 5, wherein at its small-diameter end said member is formed with a bore extending coaxially with said axis, and wherein said bore accommodates one end of a removable pilot extension drill, the other end of which drill projects outwardly of said member and beyond sad skirt.

7. A drill according to claim 6, wherein each end of the pilot extension drill is formed with at least one cutting edge.

References Cited
UNITED STATES PATENTS 2,897,696   8/1959   Tisserant   77—67

FOREIGN PATENTS 810,912   8/1951   Germany   77—66
123,605   3/1919   Great Britain   77—67

FRANCIS S. HUSAR, Primary Examiner

U.S. Cl. X.R.

77—66